(12) United States Patent
Fu

(10) Patent No.: US 7,737,064 B2
(45) Date of Patent: Jun. 15, 2010

(54) OPTICAL GLASS CONTAINING BISMUTH OXIDE

(75) Inventor: Jie Fu, Kanagawa (JP)

(73) Assignee: O'Hara, Inc., Sagamihara-Shi, Kanagawa (JP)

( * ) Notice: Subject to any disclaimer, the term of this patent is extended or adjusted under 35 U.S.C. 154(b) by 0 days.

(21) Appl. No.: 11/918,713

(22) PCT Filed: Apr. 27, 2006

(86) PCT No.: PCT/JP2006/309217

§ 371 (c)(1),
(2), (4) Date: Oct. 18, 2007

(87) PCT Pub. No.: WO2006/118333

PCT Pub. Date: Nov. 9, 2006

(65) Prior Publication Data

US 2009/0069165 A1    Mar. 12, 2009

(30) Foreign Application Priority Data

Apr. 28, 2005  (JP)  .............................. 2005-132537
Apr. 28, 2005  (JP)  .............................. 2005-133439

(51) Int. Cl.
| | |
|---|---|
| C03C 3/062 | (2006.01) |
| C03C 3/068 | (2006.01) |
| C03C 3/066 | (2006.01) |
| C03C 3/064 | (2006.01) |
| C03C 3/12 | (2006.01) |
| C03C 3/16 | (2006.01) |
| C03C 3/19 | (2006.01) |

(52) U.S. Cl. .............................. 501/73; 501/77; 501/78; 501/79; 501/41; 501/45; 501/47

(58) Field of Classification Search ............. 501/41–52, 501/73, 77–79

See application file for complete search history.

(56) References Cited

U.S. PATENT DOCUMENTS 6,333,282 B1 * 12/2001 Nakahata et al. .............. 501/45

(Continued)

FOREIGN PATENT DOCUMENTS

JP       01-308843       12/1989

(Continued)

OTHER PUBLICATIONS

Ford, N. et al., "*Optical and Physical Properties of Glasses in the Systems $GeO^2$-$Bi_2O_3$-PbO and $TeO_2$-$Bi_2O_3$-$WO_3$*", Glass Technology vol. 28, No. 2, Apr. 1987, pp. 106-113.

(Continued)

*Primary Examiner*—Karl E Group
*Assistant Examiner*—Noah S Wiese
(74) *Attorney, Agent, or Firm*—Squire, Sanders & Dempsey L.L.P.

(57) ABSTRACT

Optical glass having a refractive index ($n_d$) of 1.75 or greater, and an Abbe number ($v_d$) falling within the range of 15 to 40, which is suitable for molding by precision mold press is provided. The optical glass is characterized by including $B_2O_3$+$SiO_2$ in an amount of 10 to 70%, $Bi_2O_3$ in an amount of 5% or more and less than 25%, RO+$Rn_2$O in an amount of 5 to 60% (wherein R represents one or more selected from a group consisting of Zn, Ba, Sr, Ca, and Mg; and Rn represents one or more selected from a group consisting of Li, Na, K, and Cs), with each component in the range expressed in oxide-based mole, and is characterized in that transparency in the visible region is high, and that the transition point (Tg) is 520° C. or lower. The optical glass is characterized by having a spectral transmittance of 70% or greater at a wavelength of 550 nm, for a thickness of 10 mm.

15 Claims, 1 Drawing Sheet

U.S. PATENT DOCUMENTS

| | | | |
|---|---|---|---|
| 6,828,265 B2 * | 12/2004 | Uehara | 501/73 |
| 2004/0220040 A1 | 11/2004 | Uehara | |
| 2004/0254057 A1 | 12/2004 | Schreder et al. | |
| 2004/0266602 A1 * | 12/2004 | Fujiwara et al. | 501/46 |
| 2006/0063660 A1 | 3/2006 | Schreder et al. | |
| 2007/0105702 A1 * | 5/2007 | Matsumoto et al. | 501/50 |

FOREIGN PATENT DOCUMENTS

| | | | |
|---|---|---|---|
| JP | 08-157231 | | 6/1996 |
| JP | 2001/139345 | | 5/2001 |
| JP | 2001-139345 | * | 5/2001 |
| JP | 2003/034550 | | 6/2003 |
| JP | 2003-300751 | | 10/2003 |
| JP | 2003-321245 | | 11/2003 |
| SU | 947 102 | | 7/1982 |
| SU | 947102 | | 7/1982 |
| WO | 2004/074197 | | 9/2004 |

OTHER PUBLICATIONS

Lapp, Josef C., "*Glasses*", American Ceramic Society Bulletin, vol. 71, No. 10, Oct. 1992, pp. 1543-1552.

Huang, Wen-Hai et al., "*Color and Selected Properties of PbO-$BiO_{1.5}$-$GaO_{1.5}$ Glasses*" American Ceramic Society, vol. 77, No. 4, Oct. 1994, pp. 1017-1024.

Dumbaugh, William H. et al., "*Heavy-Metal Oxide Glasses*", American Ceramic Society, vol. 75, No. 9, Oct. 1992, pp. 2315-2326.

Dumbaugh, W.H., "*Heavy-Metal Oxide Glasses Containing $Bi_2O_3$*", Physics and Chemistry of Glasses, vol. 27, No. 3, Jun. 1986, pp. 119-123.

Deparis et al., "Origin and Enhancement of the Second-Order Non-Linear Optical Susceptibility Induced in Bismuth Borate Glasses by Thermal Policy", Journal of Non-Crystalline Solids, North-Holland Physics Publishing, vol. 351, No. 27-29, Aug. 15, 2005, pp. 2166-2177, Abstract.

* cited by examiner

OPTICAL GLASS CONTAINING BISMUTH OXIDE

TECHNICAL FIELD

The present invention relates to an optical glass having high transparency in visible regions, and having optical constants such that the refractive index ($n_d$) is 1.75 or greater, and an Abbe number ($v_d$) is within a range of 15 to 40, so that the glass is suited for molding by precision mold press.

BACKGROUND ART

Conventionally, optical glass having a high refractive index and with a high dispersion region are typically of a composition containing a large amount of lead oxide. Because of favorable glass stability and a low glass transition point (Tg), they have been used for precision mold press molding. For example, Patent Document 1 discloses an optical glass for a precision mold press which contains a large amount of lead oxide.

However, a reduction condition is maintained in order to prevent oxidation of the mold when molding by a precision mold press is performed. Therefore, when the glass component contains lead oxide, lead reduced from the glass surface breaks off and adheres to the mold surface. Accordingly, there have been problems in that the precision face of the mold is not maintained. Also, lead oxide is toxic to the environment so that glass free from lead oxide has been desired.

To meet such needs, many types of optical glass for press molding a having high refractive index with a high dispersion region, and not containing lead oxide have been developed. However, most of these types are phosphate glass that contain $Nb_2O_5$ at a high concentration. For example, Patent Document 2 and Patent Document 3 disclose $P_2O_5$—$Nb_2O_5$—$WO_3$—($K_2O$, $Na_2O$, $Li_2O$) based glass, and Patent Document 4 discloses $P_2O_5$—$Nb_2O_5TiO_2$—$Bi_2O_3$—$Na_2O$ based glass. However, many of these types of glass have a Tg that is said to be low, exceeding 480° C. Furthermore, these types of glass must include a large amount of $Nb_2O_5$ for achieving a high refractive index with high dispersion; therefore, they may be disadvantageous in that devitrification resistance is not that high.

In addition, compositions including a large amount of $Bi_2O_3$ have been known for glass having a low Tg. For example, Nonpatent Documents 1, 2, 3, 4, and 5 disclose $Bi_2O_3$—$Ga_2O_3$—PbO based glass, $Bi_2O_3$—$Ga_2O_3$—($Li_2O$, $K_2O$, $Cs_2O$) based glass, and $Bi_2O_3$—$GeO_2$ based glass. Although these types of glass have Tg of 480° C. or lower, the absorption edge of the glass is longer than 450 nm. Hence, transparency in the visible region may be drastically reduced, and thus, these types of glass cannot be used as an optical lens required to have high transparency in the visible region.

[Patent Document 1] Japanese Patent Application Laid Open No. H1-308843

[Patent Document 2] Japanese Patent Application Laid Open No. 2003-321245

[Patent Document 3] Japanese Patent Application Laid Open No. H8-157231

[Patent Document 4] Japanese Patent Application Laid Open No. 2003-300751

[Nonpatent Document 1] Physics and Chemistry of Glasses, p 119, Vol. 27, No. 3, June 1986

[Nonpatent Document 2] American Ceramic Society, p 2315, Vol. 75, No. 9, October 1992

[Nonpatent Document 3] American Ceramic Society, p 1017, Vol. 77, No. 4, October 1994

[Nonpatent Document 4] American Ceramic Society Bulletin, p 1543, Vol. 71, No. 10, October 1992

[Nonpatent Document 5] Glass Technology, p 106, Vol. 28, No. 2, April 1987

DISCLOSURE OF THE INVENTION

Problems to be Solved by the Invention

An object of the present invention is to provide a novel optical glass having a refractive index ($n_d$) of 1.75 or greater and an Abbe number ($v_d$) falling within the range of 15 to 40, having high transparency in the visible region with a glass transition point (Tg) of 520° C. or lower and is suited for molding by precision mold press.

Means for Solving the Problems

The present inventor carried out considerable research in order to solve the aforementioned problems, as a result of which he invented an optical glass that is transparent in the visible region and is satisfactory as an optical lens, has a refractive index ($n_d$) of 1.75 or greater and a glass transition point (Tg) of 520° C. or less, which does not include substances that are environmentally undesirable but exhibits extremely favorable precision mold press capability, through combining $Bi_2O_3$ and preferably an alkali metal oxide and/or an alkaline earth metal oxide in a boric acid salt system and/or a silicic acid salt system, being a system that is completely different from the preexisting phosphoric acid salt system.

More specifically, in a first aspect of the present invention, optical glass includes $Bi_2O_3$ in an amount of 5% or more and less than 25% expressed in oxide-based mole percentage, and having a refractive index ($n_d$) of 1.75 or greater, and an Abbe number ($v_d$) of 15 to 40.

In a second aspect of the present invention, the optical glass according to the first aspect has a spectral transmittance of 70% or greater at a wavelength of 550 nm, for a thickness of 10 mm (optical path length: 10 mm).

In a third aspect of the present invention, the optical glass according to the first or second aspect has a transition point (Tg) of 520° C. or lower.

In fourth aspect of the present invention, an optical glass includes $B_2O_3+SiO_2$ in an amount of 10 to 70%, and/or $Bi_2O_3$ in an amount of 5% or more and less than 25%, and/or $RO+Rn_2O$ in an amount of 5 to 60% (wherein R represents one or more constituents selected from a group consisting of Zn, Ba, Sr, Ca, and Mg; and Rn represents one or more constituents selected from a group consisting of Li, Na, K, and Cs), and/or $Sb_2O_3+As_2O_3$ in an amount of 0 to 5%, the ranges being expressed in oxide-based mole percentage, wherein a wavelength at which the spectral transmittance of 70% is exhibited, for a thickness of 10 mm, is 520 nm or less, the refractive index ($n_d$) is 1.75 or greater, and the Abbe number ($v_d$) is 15 to 40.

In a fifth aspect of the present invention, the optical glass according to any one of the first to fourth aspects has part or all of $B_2O_3$ and/or $SiO_2$ substituted with $GeO_2$.

In a sixth aspect of the present invention, the optical glass according to any one of the first to fifth aspects includes one or two of $Al_2O_3$ and/or $Ga_2O_3$ constituents in an amount of 0 to 20% expressed in oxide-based mole percentage.

In a seventh aspect of the present invention, the optical glass according to any one of the first to sixth aspects includes $P_2O_5$ in an amount of 0 to 8% expressed in oxide-based mole percentage.

In an eighth aspect of the present invention, the optical glass according to any one of the first to seventh aspects includes $TiO_2$ in an amount of 0 to 25% expressed in oxide-based mole percentage.

In a ninth aspect of the present invention, the optical glass according to any one of the first to eighth aspects includes one or more of $La_2O_3$, and/or $Y_2O_3$, and/or $Gd_2O_3$ constituents in an amount of 0 to 25% expressed in oxide-based mole percentage.

In a tenth aspect of the present invention, the optical glass according to any one of the first to ninth aspects includes one or more of $ZrO_2$, and/or $SnO_2$, and/or $Nb_2O_5$, and/or $Ta_2O_5$, and/or $WO_3$ constituents in an amount of 0 to 10% expressed in oxide-based mole percentage.

In an eleventh aspect of the present invention, the optical glass according to any one of the first to tenth aspects has an absorption edge 430 nm or lower.

In a twelfth aspect of the present invention, the optical glass according to any one of the first to eleventh aspects has a $B_2O_3/SiO_2$ value (mole percentage ratio), expressed in oxide-based mole percentage, 0.2 or greater.

In a thirteenth aspect of the present invention, the optical glass according to any one of the first to twelfth aspects that is for precision molding.

In a fourteenth aspect of the present invention, an optical element is formed by molding glass for precision molding according to the thirteenth aspect.

Effects of the Invention

The optical glass of the present invention includes $Bi_2O_3$ and preferably an alkali metal oxide and/or an alkaline earth metal oxide in combination as a glass component; therefore, transmittance which is satisfactory for optical lenses in the visible region, high refractive index ($n_d$=1.75 or greater) and low Abbe number ($v_d$=15 to 40) can be achieved while maintaining a glass transition point (Tg) of 520° C. or lower. Accordingly, an optical glass that can be molded by a precision mold press can be provided.

PREFERRED MODE FOR CARRYING OUT THE INVENTION

Figure 1:
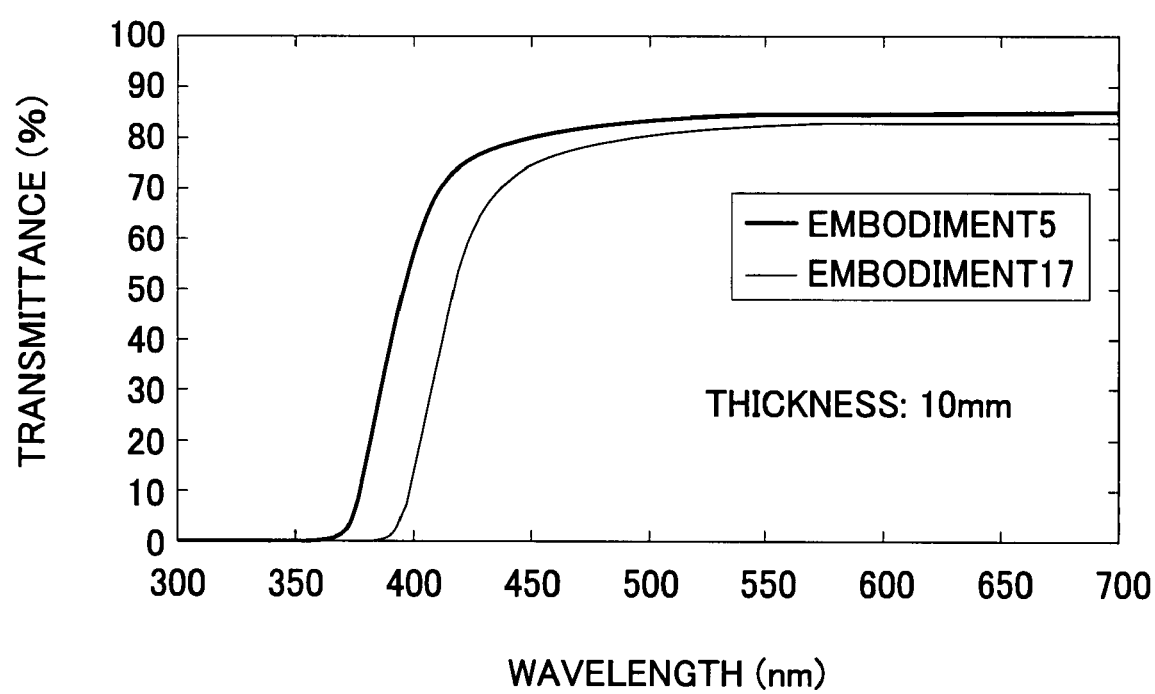
FIG. 1 shows a spectral transmittance curve for the glass of Embodiments 5 and 17. The abscissa represents the wavelength (nm), and the ordinate represents the spectral transmittance (%).

Grounds for defining the composition range of each component that constitutes the optical glass of the present invention as described above will be described below. Each component is expressed in oxide-based mole percentage.

$B_2O_3$ and $SiO_2$ components are oxides for forming glass, either of which is essential for obtaining stable glass. In order to obtain stable glass, the lower total content limit of one or two of these components is preferably 10%, more preferably 15%, and most preferably 20%. However, for attaining a refractive index of 1.75 or greater and Tg of 520° C. or lower, the upper content limit is preferably 70%, more preferably 65%, and most preferably 60%. The object of the present invention can be achieved even if these two components are introduced into the glass alone; however, concurrent use is preferred because melting properties, stability and chemical durability of the glass may be enhanced, accompanied by improvement of transparency in the visible region, when they are used concurrently. Additionally, in order to maximize the aforementioned effect, mole percentage of $B_2O_3/SiO_2$ is preferably 0.2 or greater, more preferably 0.5 or greater, and most preferably 1.0 or greater.

The $GeO_2$ component is effective in improving the stability and the refractive index of the glass, and further, is responsible for high dispersion; therefore, it is an optional component which can be introduced into the glass to substitute for a part or all of $B_2O_3$ or $SiO_2$. However, due to its expensiveness, the upper content limit is preferably 40%, more preferably 35%, and most preferably 30% in order to maintain the Tg to be 520° C. or lower.

The $Bi_2O_3$ component contributes greatly towards improving the stability of the glass, and is necessary for achieving the object of the present invention which is, in particular, to attain a refractive index ($n_d$) of 1.75 or greater and a Tg of 520° C. or lower. Because the refractive index and the Tg in the present invention are strongly dependent on the $Bi_2O_3$ content, a content that is too low may result in not only failure in attaining the $n_d$ of 1.75, but also the Tg exceeding 520° C. However, when the content is too high, the absorption edge of the glass may shift toward the long-wavelength side, and thus, the transmittance in the visible region is lowered. Therefore, the content preferably falls within the range of 5% or greater and 25% or less. A more preferable range is 7% or greater and less than 25%, and a most preferable range is 10% or greater and less than 25%.

The RO, $Rn_2O$ (wherein R represents one or more constituents selected from a group consisting of Zn, Ba, Sr, Ca, and Mg; and Rn represents one or more constituents selected from a group consisting of K, Na, Li, and Cs) constituents are effective in improving the melting property and stability of the glass, and in lowering the Tg. Furthermore, they play a major role in improving the transparency of the glass in the visible region; therefore, either one of these constituents is essential. When total content of one or two of these constituents (RO+$Rn_2O$) is less than 5%, the effect is minimal, while when the content exceeds 60%, stability of the glass is inferior. Hence, the total content of these components preferably is within the range of 5 to 60%. The total content is more preferably within the range of 8 to 55%, and particularly preferably within the range of 15 to 50%. However, when the RO is introduced alone, a suitable content for achieving the aforementioned effect is within the range of 5 to 50%, more preferably within the range of 10 to 40%, and most preferably within the range of 15 to 35%. Among the RO components, BaO and ZnO components are the most effective; therefore, either of these is preferably included. Additionally, when one or two among SrO, CaO, and MgO is concurrently included, stability, chemical durability, and transmittance in the visible region of the glass are further improved. Therefore, it is most preferred that one or two of these components, and either one or both of BaO and ZnO be concurrently included. Moreover, when $Rn_2O$ is introduced alone, suitable content for achieving the aforementioned effect falls within the range of 5 to 40%, more preferably within the range of 8 to 40%, and most preferably within the range of 15 to 35%. Of the $Rn_2O$ components, $Li_2O$ and $Na_2O$ components most eminently exert the aforementioned effect; therefore, it is preferred that either one or both of these be included. In addition, for further improving the chemical durability of the glass, use in combination with $K_2O$ is preferred. Moreover, $Cs_2O$ which plays the same role as $Rn_2O$ can also be added in a small amount.

The $Al_2O_3$, $Ga_2O_3$ components can be optionally added because they are effective in improving the melting property and chemical durability of the glass. It is particularly desirable that they be introduced so as to substitute for $B_2O_3$ or $SiO_2$ or $GeO_2$. However, in the case of the composition containing $B_2O_3$ or $SiO_2$ or $GeO_2$ at a content exceeding 45%, introduction of these components may lead to the Tg exceeding 520° C. Therefore, these components should be introduced to the composition with the content of $B_2O_3$ or $SiO_2$ or $GeO_2$ being 45% or less, more preferably 40% or less, and particularly preferably 35% or less. When the total content of one or two of these components is too low, the effect may not be realized, while too great a total content may result in deterioration of the melting property and stability of the glass, and may also be accompanied by large elevation of the Tg. Therefore, the total content of $Al_2O_3$ and $Ga_2O_3$ preferably falls within the range of 0 to 20%. The total content falls more preferably within the range of 0.1 to 20%, even more preferably within the range of 0.5 to 10%, and particularly preferably within the range of 0.5 to 5%.

The $P_2O_5$ component can be optionally added because it is effective in improving the melting property of the glass. However, too great an amount thereof may cause the melting property of the glass to deteriorate. Therefore, the content of this component preferably falls within the range of 0 to 8%. The content falls more preferably within the range of 0.1 to 8%, even more preferably within the range of 0.5 to 5%, and particularly preferably within the range of 0.5 to 4%.

The $TiO_2$ component can be optionally added because it is effective in contributing to improvement of the refractive index and chemical durability of the glass, and to attaining high dispersion. However, too small an amount thereof may not achieve such effects, while too great an amount may cause the melting property of the glass and the stability of the glass to deteriorate, in addition to a large elevation of the Tg.

Therefore, the content of this component preferably falls within the range of 0 to 25%. The content falls more preferably within the range of 0.1 to 25%, even more preferably within the range of 0.5 to 20%, and particularly preferably within the range of 0.5 to 15%.

The $La_2O_3$, $Y_2O_3$, $Gd_2O_3$ components can be optionally added because they are effective in contributing to improvement of the refractive index, chemical durability and transparency of the glass, and to attaining low dispersion. When the total content of one or two or more of these components is too low, the effect may not be realized, while too great a total content may result in not only deterioration of the melting property and stability of the glass, but also elevation of the Tg. Therefore, the content preferably falls within the range of 0 to 25%. The content falls more preferably within the range of 0.1 to 25%, even more preferably within the range of 0.5 to 20%, and particularly preferably within the range of 0.5 to 15%.

The $ZrO_2$, $SnO_2$, $Nb_2O_5$, $Ta_2O_5$, $WO_3$ components can be optionally added because they are effective in improvement of the refractive index and chemical durability of the glass.

When the total content of one or two or more of these components is too low, the effect may not be realized, while too great total content may result in deterioration of the melting property and stability of the glass, in addition to a large elevation of the Tg. Therefore, the content preferably falls within the range of 0 to 10%. The content falls more preferably within the range of 0.1 to 10%, even more preferably within the range of 0.5 to 8%, and particularly preferably within the range of 0.5 to 5%.

The $Sb_2O_3$ or $As_2O_3$ component can be added for defoaming the glass during melting, an amount of up to 5% being sufficient.

It is preferred that PbO, that is not appropriate as a component for optical glasses molded using a mold press, be excluded.

The optical glass of the present invention has a refractive index ($n_d$) of 1.75 or greater, and an Abbe number ($v_d$) falling within the range of 15 to 40. More preferred ranges of $n_d$ and $v_d$ are 1.77 to 2.10 and 15 to 40, respectively, and most preferred ranges are 1.80 to 2.00 and 15 to 35, respectively.

In addition to high refractive index and high dispersion, the optical glass of the present invention can readily achieve a transition point (Tg) of 520° C. or lower. Furthermore, one having the Tg falling within the more preferred range of 350 to 500° C., and most preferred range of 380 to 500° C. can be readily obtained.

Measurement of transmittance herein was carried out in accordance with Japan Optical Glass Industrial Association Standards, JOGIS02-1975. With respect to the transparency of the optical glass of the present invention as represented by transmittance of the glass, the wavelength at which the spectral transmittance of 70% is exhibited, using a sample having a thickness of 10 mm, may be 550 nm or lower, more preferably 520 nm or lower, and most preferably 500 nm or lower.

EMBODIMENTS

The optical glass of the present invention can be manufactured by the following method. Specifically, each starting material (oxide, carbonic acid salt, nitric acid salt, phosphoric acid salt, sulfuric acid salt, or the like) was weighed in a given amount. After mixing homogeneously, the mixture was placed in a quartz crucible, an alumina crucible, a gold crucible, a platinum crucible, a gold or platinum alloy crucible, an iridium crucible, or the like, and was melted in a melting furnace at 850 to 1250° C. for 2 to 10 hrs while stirring to permit homogenization. Thereafter, the temperature was lowered to a suitable point, and casting in a mold or the like was performed to obtain glass.

The present invention will be explained below by way of Embodiments; however, the present invention is not limited to these Embodiments.

The materials were weighed such that types of glass of 400 g having the predetermined compositions shown in Tables 1 to 4 were provided. After mixing homogeneously, the mixture was melted using quartz and a platinum crucible at 950 to 1050° C. for 2 to 3 hrs. Thereafter, the temperature was lowered to 800 to 900° C., and further incubated for about 1 hour. The mixture was cast in a mold to manufacture glass. Characteristics of the resulting glass are shown in Tables 1 to 4. Furthermore, spectral transmittance was measured in Embodiment 5 and Embodiment 17. The results are shown in FIG. 1.

Measurement of the transmittance was carried out in accordance with Japan Optical Glass Industrial Association Standards JOGIS02. In the present invention, the transmittance, not the degree of coloring, is presented. Specifically, spectral transmittance at 200 to 800 nm on the parallel opposing face-polished product having a thickness of 10±0.1 mm was measured in accordance with JIS Z8722. The value of (wavelength at which the transmittance is 70%)/(wavelength at which the transmittance is 5%) is shown, which was determined by rounding off the values.

The transition point (Tg) was measured with a thermodilatometer at a temperature-ascending rate of 4° C./min.

For the refractive index ($n_d$) and the Abbe number ($v_d$), the glass was kept at around the transition point (Tg) for 2 hrs, then cooled at a slow temperature-descending rate of −25° C./Hr, and measured according to JOGIS01-2003.

Additionally, in a manner similar to the aforementioned Embodiments, a comparative example having a composition of 60 $B_2O_3$-20 $SiO_2$-20 $Bi_2O_3$ (in mole percentage) as shown in Table 4 was manufactured. The glass almost completely devitrified, and a sample that could be used for evaluation of the physical properties could not be obtained.

TABLE 1

| | Embodiments | | | | | | | | | |
|---|---|---|---|---|---|---|---|---|---|---|
| | 1 | 2 | 3 | 4 | 5 | 6 | 7 | 8 | 9 | 10 |
| $B_2O_3$ | 40 | 25 | 30 | 40 | 32 | 10 | 10 | 35 | 20 | 40 |
| $SiO_2$ | 10 | 10 | 10 | 8 | 10 | 10 | 10 | 10 | 10 | |
| $GeO_2$ | | 15 | | | | 30 | 25 | | 15 | |
| $P_2O_5$ | | | | 2 | | | | | | |
| $Bi_2O_3$ | 10 | 10 | 10 | 10 | 12 | 15 | 15 | 15 | 15 | 20 |
| $Al_2O_3$ | | | | | | | | | | |
| $Ga_2O_3$ | | | | | | | | | | |
| ZnO | 10 | 10 | 10 | 10 | 10 | 10 | 10 | 10 | 10 | 10 |
| BaO | 10 | 10 | 10 | 10 | 10 | 10 | 10 | 10 | 10 | 10 |
| SrO | | | | | | | | | | |
| CaO | 10 | 10 | 10 | 10 | 10 | 5 | 5 | 10 | 10 | 10 |
| MgO | | | | | | | | | | |
| $K_2O$ | | | | | | | | | | |
| $Na_2O$ | | | | | | | | | | |
| $Li_2O$ | 10 | 10 | 10 | 10 | 10 | 10 | 10 | 10 | 10 | 10 |
| $TiO_2$ | | | 10 | | | | 5 | | | |
| $ZrO_2$ | | | | | | | | | | |
| $Y_2O_3$ | | | | | | | | | | |
| $Gd_2O_3$ | | | | | | | | | | |
| $La_2O_3$ | | | | | 6 | | | | | |
| $SnO_2$ | | | | | | | | | | |
| $WO_3$ | | | | | | | | | | |
| $Nb_2O_5$ | | | | | | | | | | |
| $Ta_2O_5$ | | | | | | | | | | |
| $Sb_2O_3$ | 0.02 | | | | | | | | 0.02 | |
| $As_2O_3$ | | 0.02 | | | | | | | | |
| Tg | 458 | 468 | 475 | 455 | 460 | 445 | 453 | 435 | 443 | 410 |
| $n_d$ | 1.760 | 1.774 | 1.808 | 1.755 | 1.801 | 1.883 | 1.909 | 1.822 | 1.848 | 1.881 |
| $v_d$ | 33.6 | 32.3 | 28.8 | 33.6 | 32.0 | 24.8 | 23.5 | 28.2 | 26.7 | 24.5 |
| $\lambda_{70\%}$ | 425 | 425 | 430 | 425 | 410 | 430 | 440 | 440 | 445 | 430 |
| $\lambda_{5\%}$ | 370 | 370 | 390 | 370 | 370 | 390 | 390 | 380 | 380 | 390 |

TABLE 2

| | Embodiments | | | | | | | | | |
|---|---|---|---|---|---|---|---|---|---|---|
| | 11 | 12 | 13 | 14 | 15 | 16 | 17 | 18 | 19 | 20 |
| $B_2O_3$ | 30 | 20 | 27 | 27 | 10 | 30 | 30 | 20 | 10 | 27 |
| $SiO_2$ | 10 | 20 | 10 | 10 | 20 | 10 | 10 | 10 | 10 | 10 |
| $GeO_2$ | | | | | 10 | | | | 10 | |
| $P_2O_5$ | | | | | | | | | | |
| $Bi_2O_3$ | 20 | 20 | 20 | 20 | 20 | 20 | 20 | 20 | 20 | 20 |
| $Al_2O_3$ | | | 3 | | | | | | | |
| $Ga_2O_3$ | | | | 3 | | | | | | |
| ZnO | 10 | 10 | 10 | 10 | 10 | 10 | 10 | 10 | 10 | 10 |
| BaO | 10 | 10 | 10 | 10 | 10 | 10 | 10 | 10 | 10 | 10 |
| SrO | | | | | | | 10 | | | |
| CaO | 10 | 10 | 10 | 10 | 10 | 10 | | 10 | 10 | 10 |
| MgO | | | | | | | | | | |
| $K_2O$ | | | | | | | 10 | | | |
| $Na_2O$ | | | | | | | | | | |
| $Li_2O$ | 10 | 10 | 10 | 10 | 10 | | 10 | 10 | 10 | 10 |
| $TiO_2$ | | | | | | | | 10 | 10 | |
| $ZrO_2$ | | | | | | | | | | |
| $Y_2O_3$ | | | | | | | | | | 3 |
| $Gd_2O_3$ | | | | | | | | | | |
| $La_2O_3$ | | | | | | | | | | |
| $SnO_2$ | | | | | | | | | | |
| $WO_3$ | | | | | | | | | | |
| $Nb_2O_5$ | | | | | | | | | | |
| $Ta_2O_5$ | | | | | | | | | | |
| $Sb_2O_3$ | | | | | 0.05 | 0.05 | | | | |
| $As_2O_3$ | | | | | | | | | | |
| Tg | 415 | 420 | 420 | 418 | 428 | 423 | 428 | 430 | 435 | 425 |
| $n_d$ | 1.885 | 1.889 | 1.872 | 1.875 | 1.911 | 1.825 | 1.863 | 1.953 | 1.971 | 1.892 |
| $v_d$ | 24.3 | 24.1 | 24.6 | 24.7 | 23.0 | 24.7 | 25.6 | 21.3 | 20.7 | 24.4 |
| $\lambda_{70\%}$ | 440 | 440 | 445 | 445 | 455 | 450 | 435 | 480 | 480 | 445 |
| $\lambda_{5\%}$ | 400 | 400 | 400 | 400 | 400 | 400 | 395 | 410 | 410 | 400 |

TABLE 3

| | Embodiments | | | | | | | | | |
|---|---|---|---|---|---|---|---|---|---|---|
| | 21 | 22 | 23 | 24 | 25 | 26 | 27 | 28 | 29 | 30 |
| $B_2O_3$ | 27 | 27 | 27 | 30 | 30 | 30 | 30 | 30 | 24 | 24 |
| $SiO_2$ | 10 | 10 | 10 | 20 | 10 | 20 | 10 | 10 | 15 | 15 |
| $GeO_2$ | | | | | | | | | | |
| $P_2O_5$ | | | | | | | | | | |
| $Bi_2O_3$ | 20 | 20 | 20 | 20 | 20 | 20 | 20 | 20 | 21 | 21 |
| $Al_2O_3$ | | | | | | | | | | |
| $Ga_2O_3$ | | | | | | | | | | |
| ZnO | 10 | 10 | 10 | 10 | 20 | 20 | | | 10 | 10 |
| BaO | 10 | 10 | 10 | 10 | 10 | | 15 | 15 | 10 | 10 |
| SrO | | | | | | | 10 | 10 | | |
| CaO | 10 | 10 | 10 | 10 | 10 | | | | 10 | 10 |
| MgO | | | | | | | | | | |
| $K_2O$ | | | | | | | | | 9 | |
| $Na_2O$ | | | | | | | | 15 | | 9 |
| $Li_2O$ | 10 | 10 | 10 | | | 10 | 15 | | 1 | 1 |
| $TiO_2$ | 3 | | | | | | | | | |
| $ZrO_2$ | | 3 | | | | | | | | |
| $Y_2O_3$ | | | | | | | | | | |
| $Gd_2O_3$ | | | 3 | | | | | | | |
| $La_2O_3$ | | | | | | | | | | |
| $SnO_2$ | | | | | | | | | | |
| $WO_2$ | | | | | | | | | | |
| $Nb_2O_5$ | | | | | | | | | | |
| $Ta_2O_5$ | | | | | | | | | | |
| $Sb_2O_3$ | | | | | 0.02 | | | | | |
| $As_2O_3$ | | | | 0.02 | | | | | | |
| Tg | 425 | 428 | 425 | 475 | 465 | 430 | 412 | 415 | 420 | 420 |
| $n_d$ | 1.894 | 1.889 | 1.894 | 1.868 | 1.875 | 1.866 | 1.862 | 1.830 | 1.846 | 1.870 |
| $v_d$ | 23.9 | 24.6 | 24.3 | 25.7 | 25.4 | 25.4 | 25.2 | 24.9 | 23.9 | 23.7 |
| $\lambda_{70\%}$ | 445 | 440 | 446 | 470 | 440 | 420 | 440 | 440 | 440 | 440 |
| $\lambda_{5\%}$ | 400 | 400 | 400 | 400 | 400 | 385 | 390 | 390 | 400 | 400 |

TABLE 4

| | Embodiments | | | | | | | | | | Comparative |
|---|---|---|---|---|---|---|---|---|---|---|---|
| | 31 | 32 | 33 | 34 | 35 | 36 | 37 | 38 | 39 | 40 | Example |
| $B_2O_3$ | 24 | 25 | 24 | 24 | 24 | 24 | 10 | 16 | 25 | 20 | 60 |
| $SiO_2$ | 15 | 15 | 15 | 15 | 15 | 15 | 10 | 20 | 10 | 12 | 20 |
| $GeO_2$ | | | | | | | 8 | | | | |
| $P_2O_5$ | | | | | | | | | | | |
| $Bi_2O_3$ | 21 | 20 | 21 | 20.5 | 20.5 | 20.5 | 20 | 24 | 24 | 24 | 20 |
| $Al_2O_3$ | | | | | | | | | | | |
| $Ga_2O_3$ | | | | | | | | | | | |
| ZnO | 5 | 5 | 5 | 5 | 5 | 5 | 10 | 10 | 13 | 15 | |
| BaO | 15 | 15 | 14.5 | 15 | 15 | 15 | 10 | 10 | 5 | 5 | |
| SrO | | | | | | | | | | 3 | |
| CaO | 10 | 10 | 10 | 10 | 10 | 10 | 10 | 10 | | | |
| MgO | | | | | | | 2 | | | | |
| $K_2O$ | | | | | | | | | 1 | | |
| $Na_2O$ | 9 | 10 | 10 | 10 | 10 | 10 | | | 1 | | |
| $Li_2O$ | 1 | | | | | | | 10 | 10 | 10 | |
| $TiO_2$ | | | | | | | | | 6 | 8 | |
| $ZrO_2$ | | | | | | | | | 1 | | |
| $Y_2O_3$ | | | | | | | | | | | |
| $Gd_2O_3$ | | | | | | | | | | | |
| $La_2O_3$ | | | | | | | | | 2 | | |
| $SnO_2$ | | | 0.5 | | | | | | | | |
| $WO_2$ | | | | 0.5 | | | | | 2 | 3 | |
| $Nb_2O_5$ | | | | | 0.5 | | | | | | |
| $Ta_2O_5$ | | | | | | 0.5 | | | | | |
| $Sb_2O_3$ | | | | | | | | | | | |
| $As_2O_3$ | | | | | | | | | | | |
| Tg | 425 | 433 | 430 | 435 | 436 | 438 | 425 | 410 | 430 | 425 | Devitrification |
| $n_d$ | 1.860 | 1.848 | 1.847 | 1.844 | 1.849 | 1.846 | 1.919 | 1.933 | 1.987 | 2.015 | |
| $v_d$ | 24.4 | 24.8 | 24.9 | 25.0 | 24.8 | 25.2 | 22.8 | 22.0 | 20.2 | 19.3 | |
| $\lambda_{70\%}$ | 440 | 440 | 440 | 440 | 440 | 440 | 440 | 470 | 460 | 460 | |
| $\lambda_{5\%}$ | 400 | 400 | 400 | 400 | 400 | 400 | 400 | 410 | 415 | 415 | |

From Tables 1 to 4, it was elucidated that all glass in the Embodiments had an $n_d$ of 1.75 or greater, a $v_d$ falling within the range of 15 to 40, and a Tg of 490° C. or lower. Moreover, from the spectral transmittance curve shown in FIG. 1, it is understood that the glass of the present invention has no absorption in the visible region and has high transparency. Because the absorption edge of the glass shifts toward the lower wavelength as the thickness of the glass becomes smaller, and the transparency at the short wavelength varies depending on the thickness, in the present invention, values were obtained for wavelength at which spectral transmittances of 70% and 5% ($\lambda_{70\%}$ and $\lambda_{5\%}$) are exhibited, for a thickness of 10 mm and transparency of the glass was evaluated. The results are shown in Tables 1 to 4. Herein, the wavelength at which the spectral transmittance of 5% is exhibited is referred to as glass absorption edge. It was demonstrated that all glass had the wavelengths that exhibit the spectral transmittance of 70%, of 550 nm or lower, and absorption edges of 430 nm or lower, suggesting high transparency in the visible region.

Additionally, as a result of experiments with a precision mold press using these types of glass, lenses with high precision were obtained, and favorable transferability was exhibited without adhesion of the glass to the mold.

INDUSTRIAL APPLICABILITY

As described above, the optical glass of the present invention has as an optical constant, a refractive index ($n_d$) of 1.75 or greater, and has high transparency in the visible region, having a transition point (Tg) of 520° C. or lower, and is suited to molding by a precision mold press. In addition, the optical glass can be applied to any of: a method in which a melted glass is directly molded to obtain an optical element such as a lens; and a method in which molding is performed from a melted glass via a preform mold (which can be obtained by a method of molding through obtaining a melted glass in a mold, a method of press molding, a method of polishing and grinding, or the like) to obtain an optical element such as a lens.

Moreover, the optical glass of the present invention is suitable for lenses for optical communication, the demand of which has been rapidly increasing in recent years. The lens for optical communication is a glass lens which functions by injecting a laser beam emitted from a luminous body such as semiconductor laser into an optical fiber at high efficiency, and is a micro-optical accessory that is necessary for members for optical communication. Although a ball lens, a nonspherical lens or the like may be used as this lens, a required characteristic therefore is a high refractive index. In particular, the optical glass of the present invention is suited for molding by precision mold press in cases in which it is used as a nonspherical lens.

The invention claimed is:

1. An optical glass comprising $Bi_2O_3$ as an essential component in an amount greater than or equal to 5% and less than 25%, $P_2O_5$ in an amount of 0 to 8%, and RO in an amount of 5 to 32%, all expressed in oxide-based mole percentage, wherein R represents one or more constituents selected from the group consisting of Zn, Ba, Sr, Ca and Mg, said optical glass having a refractive index ($n_d$) of 1.75 or greater, and an Abbe number ($v_d$) of 15 to 40.

2. An optical glass according to claim 1, having a spectral transmittance of 70% or greater at a wavelength of 550 nm, for a thickness of 10 mm.

3. An optical glass according to claim 1 having a transition point (Tg) of 520° C. or lower.

4. An optical glass according to claim 1, comprising $B_2O_3$+$SiO_2$ in an amount of 10 to 70% and/or RO+$Rn_2O$ in an amount of 5 to 60%, wherein R represents one or more constituents selected from a group consisting of Zn, Ba, Sr, Ca, and Mg, and Rn represents one or more constituents selected from a group consisting of Li, Na, K, and Cs, and/or $Sb_2O_3$+$As_2O_3$ in an amount of 0 to 5%, the ranges being expressed in oxide-based mole percentage, wherein a wavelength at which a spectral transmittance of 70% is exhibited for a thickness of 10 mm is 520 nm or less.

5. An optical glass according to claim 4, wherein a part or all of the $B_2O_3$ and/or the $SiO_2$ is substituted with $GeO_2$.

6. An optical glass according to claim 1 comprising one or two of $Al_2O_3$ and/or $Ga_2O_3$ constituents in an amount of 0 to 20% expressed in oxide-based mole percentage.

7. An optical glass according to claim 1 comprising $TiO_2$ in an amount of 0 to 25% expressed in oxide-based mole percentage.

8. An optical glass according to claim 1 comprising one or more of $La_2O_3$ and/or $Y_2O_3$ and/or $Gd_2O_3$ constituents in an amount of 0 to 25% expressed in oxide-based mole percentage.

9. An optical glass according to claim 1 comprising one or more of $ZrO_2$ and/or $SnO_2$ and/or $Nb_2O_5$ and/or $Ta_2O_5$ and/or $WO_3$ constituents in an amount of 0 to 10% expressed in oxide-based mole percentage.

10. An optical glass according to claim 1 wherein an absorption edge is 430 nm or less.

11. An optical glass according to claim 4 wherein the $B_2O_3$/$SiO_2$ value (mol % ratio), expressed in mol % based on oxide, is 0.2 or greater.

12. An optical glass for precision molding made of an optical glass according to claim 1.

13. An optical element obtained by molding the optical glass for precision molding according to claim 12.

14. An optical glass according to claim 1, further comprising at least one selected from $Nb_2O_5$ and $WO_3$ in an amount of 0.5 to 5%, expressed in oxide-based mole percentage.

15. An optical glass according to claim 1, further comprising ZnO in an amount of 0 to 15%, expressed in oxide-based mole percentage.

* * * * *

UNITED STATES PATENT AND TRADEMARK OFFICE
CERTIFICATE OF CORRECTION

PATENT NO. : 7,737,064 B2 Page 1 of 1
APPLICATION NO. : 11/918713
DATED : June 15, 2010
INVENTOR(S) : Jie Fu It is certified that error appears in the above-identified patent and that said Letters Patent is hereby corrected as shown below:

Title page, item (73) Assignee should read: Ohara, Inc.

Signed and Sealed this

Seventeenth Day of August, 2010

David J. Kappos
*Director of the United States Patent and Trademark Office*